United States Patent
Gabelli et al.

[11] Patent Number: 5,967,670
[45] Date of Patent: *Oct. 19, 1999

[54] ROLLING ELEMENT BEARING HAVING AT LEAST ONE ROLLING ELEMENT HAVING A HARDNESS GREATER THAN THE HARDNESS OF THE OTHER ROLLING ELEMENTS

[75] Inventors: Antonio Gabelli, Ijsselstein; Pieter Abraham Veenhuizen, Goirle; Gerardus De Vries, Nieuwegein, all of Netherlands

[73] Assignee: SKF Industrial Trading & Development Company B.V., Nieuwegein, Netherlands

[*] Notice: This patent is subject to a terminal disclaimer.

[21] Appl. No.: 08/852,608

[22] Filed: May 7, 1997

[30] Foreign Application Priority Data

May 15, 1996 [NL] Netherlands ............................. 1003141

[51] Int. Cl.⁶ ........................................................ F16C 33/32
[52] U.S. Cl. ............................................. 384/492; 384/491
[58] Field of Search .................................. 384/491, 492, 384/907.1, 912, 913

[56] References Cited

U.S. PATENT DOCUMENTS

| | | | |
|---|---|---|---|
| 3,425,759 | 2/1969 | Schwarzschild | 384/491 |
| 3,491,423 | 1/1970 | Haller | 384/491 |
| 3,764,188 | 10/1973 | Suska | 384/463 |
| 3,802,753 | 4/1974 | Parker | 384/491 |
| 4,830,933 | 5/1989 | Hodes et al. | 428/646 |
| 4,836,695 | 6/1989 | Baureis et al. | 384/276 |
| 4,966,552 | 10/1990 | Gonser | 384/492 X |
| 5,203,228 | 4/1993 | Miyawaki et al. | 74/579 R |
| 5,284,394 | 2/1994 | Lemelson | 384/491 X |
| 5,456,008 | 10/1995 | Hugon | 384/491 X |

FOREIGN PATENT DOCUMENTS

| | | |
|---|---|---|
| A2-0 89155 | 9/1983 | European Pat. Off. . |
| A 0 320 951 | 6/1989 | European Pat. Off. . |
| A 2 479 369 | 10/1981 | France . |
| A 25 11 120 | 9/1976 | Germany . |
| A 60-018620 | 1/1985 | Japan . |
| A 06 280880 | 10/1994 | Japan . |

*Primary Examiner*—Daniel P. Stodola
*Assistant Examiner*—Gregory T. Strimbu
*Attorney, Agent, or Firm*—Oliff & Berridte, PLC

[57] ABSTRACT

A rolling element bearing includes an outer ring and an inner ring which enclose a bearing space containing rolling elements. The rings are made of steel. At least one of the rolling elements comprises, at least partially as a zirconium material which is harder and stiffer than the material of the other rolling elements which are comprised of steel. Walls of indentations which are formed in the rings by solid contamination particles between the rings and one of the rolling elements having about the same hardness as the rings, are compressed as soon as the zirconium material rolling element with a substantially higher hardness than the rings overrolls the walls. Thereby, the smooth characteristic of the raceways is restored. Only small holes are left in the rings, which do not have a negative influence on the running properties of the bearing. In these small holes, minute quantities of lubricating oil are collected, which help the lubrication of the rolling elements in case of oil starvation.

18 Claims, 2 Drawing Sheets

ROLLING ELEMENT BEARING HAVING AT LEAST ONE ROLLING ELEMENT HAVING A HARDNESS GREATER THAN THE HARDNESS OF THE OTHER ROLLING ELEMENTS

BACKGROUND OF THE INVENTION

The invention is related to a rolling element bearing, comprising an outer ring and an inner ring which enclose a bearing space containing rolling elements, the rings being comprised of steel. Normally, the rolling elements of such bearing are comprised of steel as well, in particular of steel with about the same hardness properties as the steel of the rings.

During rotation of the bearing, the rolling elements roll over the raceways of the rings. Any contaminations, for instance small wear particles, which are on the raceways or the rolling elements, become compressed between these elements. Hard wear particles, for instance small steel particles which have come off of one of the components of the bearing or have entered from the outside, resist such compression and lead to the formation of minute indentations in both the raceways and the rolling elements.

It has been found that in particular the indentations in the raceways have a negative influence on the useful bearing life. Also, they lead to increased noise during running due to unsmooth running and increased play, caused by wear of the raceway surfaces.

These indentations have a craterlike shape, whereby a small central hole is surrounded by a ridge of material that has been pushed upwardly and projects above the raceway. Conversely, the rolling elements are indented as well. Due to the cyclic character of the load exerted by the rolling elements, crack formation and fatigue may occur in the rings at the location of high stress concentrations usually located just under the ridge of an indentation.

Although it has already been proposed to protect the bearings against such detrimental contamination particles by providing seals and filters, nevertheless the ingress thereof cannot always be totally prevented and therefore the formation of indentations cannot be prevented.

SUMMARY OF THE INVENTION

The object of the invention is therefore to alleviate the consequences of the occurrence of such indentations. This object is achieved in that at least one of the rolling elements is at least partially comprised of a zirconium material which is harder than the material of the other rolling elements.

Any indentations, in particular the ridges thereof, which are formed by solid contamination particles upon compression between a raceway and a rolling element of about the same hardness, are compressed as soon as a rolling element with a substantially higher hardness overrolls them. Thereby, a smooth character of the raceways is restored. Only small holes are left, which do not have a negative influence on the running properties of the bearing. In these small holes, minute quantities of lubricating oil are collected, which help the lubrication of the rolling element in case of oil starvation. Also, the stress concentration and thus the risk of crack formation and wear is basically reduced. Furthermore, the bearing will run more quietly.

Normally, the other rolling elements are comprised of steel with about the same mechanical properties as the steel used in the rings. Despite its hardness, the zirconium material has a modulus of elasticity and thermal expansion which are about the same as those of steel. Also, their Poisson's ratio are about the same. Furthermore, their specific weights do not differ much.

The advantage is that the application of such rolling elements of zirconium material amongst the other steel elements does not lead to dynamic imbalances or to differences in thermal expansion under varying temperature conditions. Thereby, under all circumstances a smooth operation of the bearing is obtained.

The added benefits of this solution are the low cost of raw materials for the making of zirconia ceramics and the possible ease of processability and workability of zirconia. For instance, grinding can be used as a possible finishing process with a feed rate of 200–1200 um/min, (for steel, a typical fine grinding feed rate is about 1500 um/min). Initial cost saving on a silicon nitride counterpart is estimated to be a factor of five.

A second embodiment of this invention comprises the use of zirconia in the making of hybrid rolling elements produced by direct sintering or press-fitting or chemical or mechanical bonding of zirconia ceramic on steel. This technology is made possible by the great similarity in the elastic constants of zirconia ceramic and steel, the thermal expansion and Young's modulus are practically equal to these of steel. Furthermore, risk of unbalance mass is also avoided, in case of concentricity errors of the two parts, because of similar density between the steel and zirconia materials.

Rolling element bearings wherein all rolling elements consist of ceramic material are already known. Having regard to the fact that in these bearings all rolling elements exert the same compressing action on the raceways, the development of such indentations with high ridges is prevented.

However, due to the higher hardness and stiffness properties of these rolling elements, the stresses induced in the rings are also higher, thus leading to a reduced life or capacity for such types of bearings.

In the bearings according to the invention, most of the rolling elements are made of steel; thus the deformation is shared equally between the contacting bodies leading to lower stress and preservation of the dynamic capacity of the bearing.

From EP-A-89155, a bearing is disclosed in which all rolling elements consist of a steel shell and a core of a zirconium material. This known bearing therefore does not have the capacity of smoothing any indentations in its raceways, having regard to the fact that all contacting surfaces consist of steel and therefore have the same hardness.

BRIEF DESCRIPTION OF THE DRAWINGS

The invention will further be explained with reference to an embodiment shown in the figures.

DETAILED DESCRIPTION OF THE PREFERRED EMBODIMENTS

Figure 1:
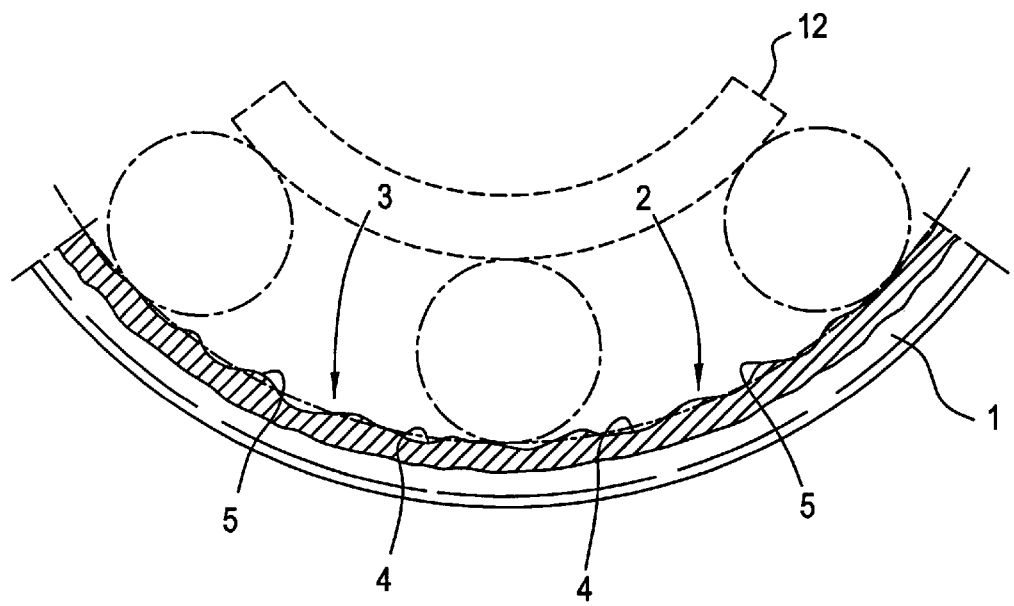
FIG. 1 shows a partially broken away side view of an outer ring, having indentations, of a bearing with normal rolling elements.

The outer ring 1 and inner ring 12 of a rolling element bearing, the other parts of which have not been shown, has a raceway 2 over which the rolling elements may roll. The outer ring 1 and the inner ring 12 enclose a bearing space containing a plurality of rolling elements 13 spaced with respect to one another. Any solid contamination particles which get caught on the surface of the rolling elements and the raceway 2, will lead to the crater-like indentations 3, comprising a small hole 4 surrounded by a ridge 5.

In turn, these ridges 5 will lead to stress concentrations and to indentations in the rolling elements themselves.

The presence of such indentations in both the rings and the rolling elements of the bearing lead to early fatigue and crack formation. Also, higher vibrations and a noisy running of the bearing are obtained.

Figure 2:
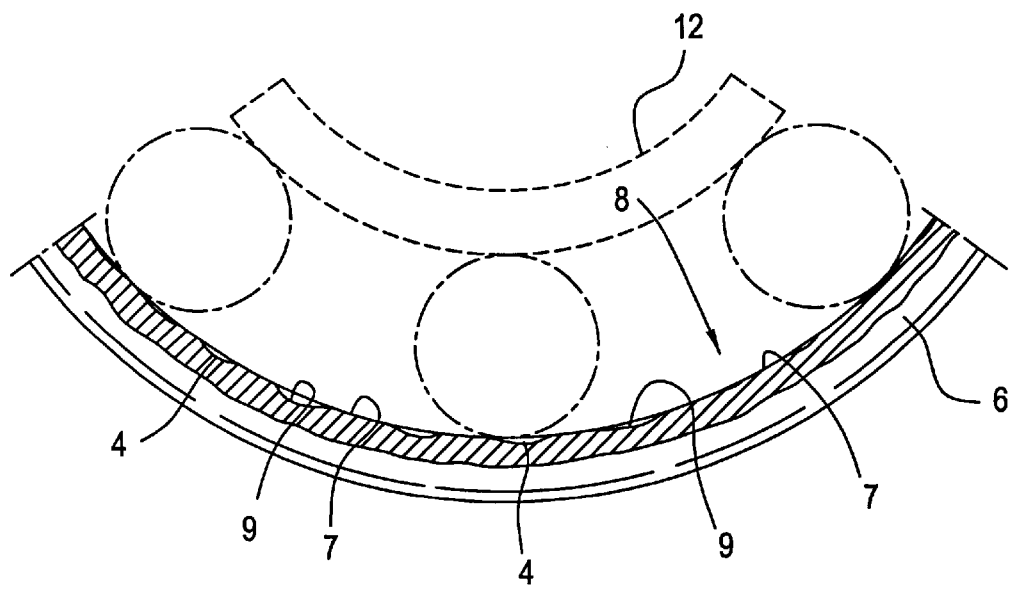
FIG. 2 shows a partially broken away view of the outer ring, having small holes, in a bearing comprising at least one stiffer or harder rolling element.

According to the invention, at least one of the rolling elements 14 is of substantially harder or stiffer nature than the other rolling elements 13 and rings 1 and 12, e.g. is made of a zirconium material. Such rolling element, when over-rolling the indentations 3, will compress at least the ridges 5 thereof, as shown in FIG. 2. Additionally, the invention may comprise two rolling elements made of the zirconium material.

In FIG. 2, an outer ring 6 is shown, of which the ridges have been compressed down, giving rise to lands 7 which correspond to the normal, non-damaged surface 8 of the ring 6. The holes which are formed by the indentations are left over.

The risk of fatigue and therefore crack formation and wear in a ring of a bearing having at least one stiffer or harder rolling element is considerably lower than in the known bearings. The presence of the small holes 4 leads to a better lubricating of the raceway 8 and the rolling elements. In the holes 4 minute amounts of oil 9 are collected, which give better lubricating characteristics.

Figure 3:
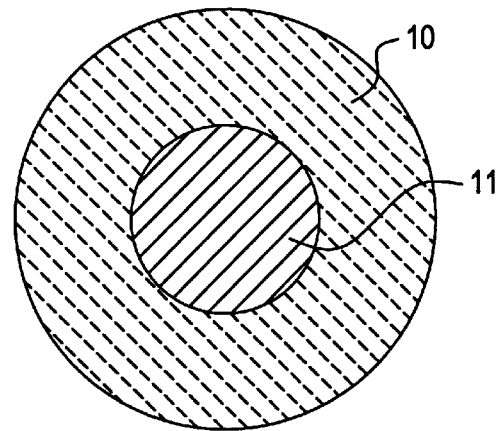
FIG. 3 shows a ball shaped rolling element.
Figure 4:
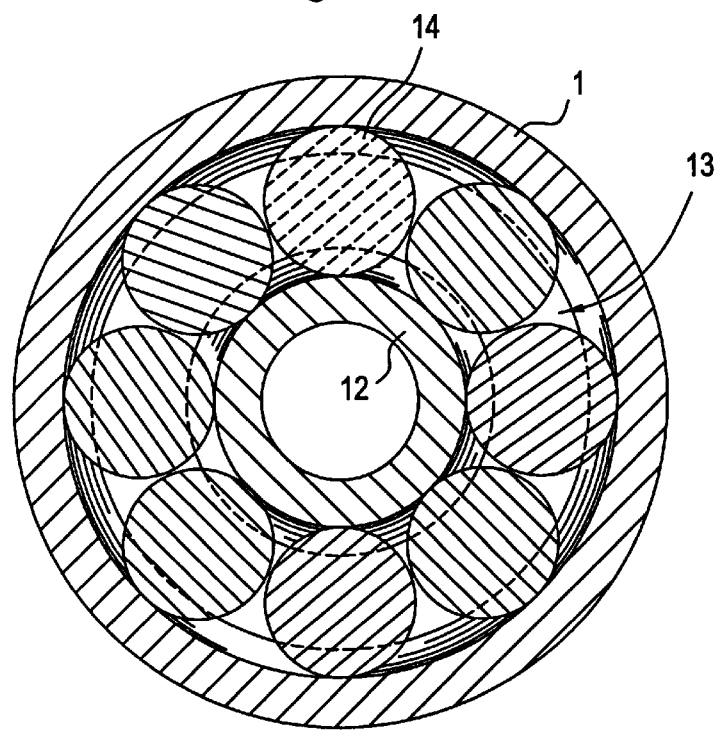
FIG. 4 shows a cross sectional view of one embodiment of the invention.

The rolling element shown in FIG. 3 is comprised of an outer shell 10 of a zirconium material such as partial stabilised zirconia ceramic $ZrO_2$ with tetragonal polycrystals. The zirconia ceramic can comprise an alloy of about 95% $ZrO_2$, 5% $Y_2O_3$ and $0.01Al_2O_3$. Its core 11 consists of a suitable steel. Of course, the rolling element according to the invention may also consist of such zirconium material.

In summary, the following advantageous embodiments are made possible by the invention.

An improved wear/contamination resistant bearing with hybrid rolling elements.

A bearing suitable for difficult lubrication, thermal and environmental conditions (grease lubrication at high speeds, high temperature, corrosive environments, hydrogen corrosion, vacuum etc).

A bearing having superior life expectancy for normal operating conditions (better resistance against surface initiated fatigue).

Also, the following problems are solved:

Unbalance mass in hybrid rolling bearings.

Uneven bearing internal clearance due to temperature changes in hybrid rolling elements bearings.

Use of combined hybrid sintering technology (steel and ceramic coupled) in bearing components.

Use of press fitting or chemical or chemical bonding technology (between ceramic and steel) for making bearing parts.

We claim:

1. A rolling element bearing, comprising an outer ring and an inner ring enclosing a bearing space containing a plurality of rolling elements including at least one first rolling element and at least one second rolling element, the inner and outer rings and the at least one second rolling element being comprised of steel and having a steel outer surface, and the at least one first rolling element includes an outer surface comprising a zirconium material having a hardness that is greater than a hardness of the steel of the at least one second rolling element.

2. A rolling element bearing according to claim 1, wherein said at least one first rolling element comprises at least two said first rolling elements, and said plurality of rolling elements are spaced with respect to each other in a circumferential direction.

3. A rolling element bearing according to claim 1, wherein the at least one first rolling element consists of the zirconium material.

4. A rolling element bearing according to claim 1, wherein said zirconium material outer surface of the at least one first rolling element comprises an outer shell.

5. A rolling element bearing according to claim 4, wherein the outer shell of the at least one first rolling element encloses a steel core.

6. A rolling element bearing according to claim 5, wherein the zirconium material is a zirconia ceramic $ZrO_2$.

7. A rolling element bearing according to claim 6, wherein the zirconia ceramic is a partially stabilized zirconia ceramic.

8. A rolling element bearing according to claim 7, wherein the partially stabilized zirconia ceramic comprises an alloy of about 95% $ZrO_2$, about 5% $Y_2O_3$ and about 0.01% $Al_2O_3$.

9. A plurality of rolling elements for use in a rolling element bearing comprising a steel outer ring and a steel inner ring enclosing a bearing space for containing the plurality of rolling elements, the plurality of rolling elements including at least one first rolling element and at least one second rolling element, the at least one second rolling element being comprised of steel and having a steel outer surface, and the at least one first rolling element having an outer surface comprising a zirconium material having a hardness that is greater than a hardness of the steel of the at least one second rolling element.

10. A rolling element bearing, comprising an outer ring and an inner ring enclosing a bearing space containing a plurality of rolling elements including at least one first rolling element and at least one second rolling element, the outer and inner rings and the at least one second rolling element each, having an outer surface comprised of steel, the at least one first rolling element including an outer surface comprised of a zirconium material having a hardness that is greater than a hardness of the steel of the outer and inner rings and the at least one second rolling element, such that the at least one first rolling element compresses ridges of indentations formed in the outer and inner rings.

11. A rolling element bearing according to claim 10, wherein the at least one first rolling element consists of the zirconium material.

12. A rolling element bearing according to claim 10, wherein said at least one first rolling element comprises at least two said first rolling elements, and said plurality of rolling elements are spaced with respect to each other in a circumferential direction.

13. A rolling element according to claim 10, wherein the zirconium material outer surface of the at least one first rolling element comprises an outer shell.

14. A rolling element bearing according to claim 13, wherein the outer shell of the at least one first rolling element encloses a steel core.

15. A rolling element bearing according to claim 14, wherein the zirconium material is a zirconia ceramic $ZrO_2$.

16. A rolling element bearing according to claim 15, wherein the zirconia ceramic is a partially stabilized zirconia ceramic.

17. A rolling element bearing according to claim 16, wherein the partially stabilized zirconia ceramic comprises an alloy of about 95% $ZrO_2$, about 5% $Y_2O_3$ and about 0.01% $Al_2O_3$.

18. A rolling element bearing, comprising a steel outer ring and a steel inner ring enclosing a bearing space containing a plurality of rolling elements including at least one first rolling element and at least one second rolling element, the at least one second rolling element being comprised of steel and having a steel outer surface, and the at least one first rolling element includes an outer surface comprised of a zirconium material having a stiffness that is greater than a stiffness of the steel forming the outer and inner rings and the steel forming at least one second rolling element, such that the at least one first rolling element compresses ridges of indentations formed in the outer and inner rings.

* * * * *